United States Patent [19]
Rockhold

[11] Patent Number: 5,092,276
[45] Date of Patent: Mar. 3, 1992

[54] HOBBLE

[76] Inventor: Clifford W. Rockhold, 232 Hoover Dr., Green River, Wyo. 82935

[21] Appl. No.: 688,817

[22] Filed: Apr. 22, 1991

[51] Int. Cl.⁵ .............................................. A01K 15/00
[52] U.S. Cl. ......................................... 119/128; 54/71
[58] Field of Search ............... 119/126, 128, 100, 106; 54/71; 70/15, 16, 18, 30, 49; 128/878, 882

[56] References Cited

U.S. PATENT DOCUMENTS

| | | | |
|---|---|---|---|
| 444,032 | 1/1891 | Whitaker | 54/71 |
| 540,871 | 6/1895 | Penfield | 54/71 |
| 2,650,590 | 9/1953 | Moore et al. | 119/128 |
| 2,761,266 | 9/1956 | Hobkirk | 54/71 |
| 4,934,321 | 6/1990 | Madsen | 119/128 |

FOREIGN PATENT DOCUMENTS 569499 1/1959 Canada ................ 119/126

Primary Examiner—Robert P. Swiatek
Assistant Examiner—Todd E. Manahan
Attorney, Agent, or Firm—Douglas M. Clarkson

[57] ABSTRACT

An improved hobble includes two or more non-abrasive leg cuffs, each of which is wrapped about the leg of an animal and connected to a center connection. Each leg cuff has a fleece or other relatively soft material covering over a length of surgical tubing, and each end of this surgical tubing is attached to a swivel. A center connection between the two leg cuffs is formed of a length of surgical tubing over a somewhat longer length of safety rope.

10 Claims, 1 Drawing Sheet

HOBBLE

BACKGROUND OF THE INVENTION

1. Field of the Invention

The present invention, in general, relates to devices to restrain the mobility of animals and, more particularly, to animal hobbles.

Hobbles are devices that limit the mobility of animals by connecting two feet close to each other, by a strap, chain, or rope, while permitting a limited ability to move. Hobbles are useful restraint devices, but they are not perfect in operation.

As a hobbled animal moves, impact on the legs occurs with each step when the hobble reaches the limit of its length. These impact forces can abrade the skin surrounding the hobbled leg of the animal.

Furthermore, the strap that surrounds the leg of the animal is often a source of irritation, especially when the hobble is used for an extended period of time. Still other imperfections in prior hobbles are found in the means for attaching and, also, in securing the hobble to the animal. They are both time consuming and prone to accidental removal.

2. Description of Prior Art

Hobbles for animals are known already in the art. For example, British Patent No. 8,515 to Hutchinson, that issued July 14, 1885, describes an early form of hobble using a rubber tube.

U.S. Pat. No. 800,794 to Connell, that issued Oct. 3, 1905, describes a combined hobble and animal tail holder.

U.S. Pat. No. 892,546 to Perkins, that issued July 7, 1908 describes a hobble comprised of leather straps and iron rings.

U.S. Pat. No. 1,543,336 to McIntire, that issued June 23, 1925, describes an elongated leather device affixed to one front limb and to one rear limb to prevent horses and other animals from kicking.

Australian Patent No. 25,686 to Heywood, that was accepted Nov. 4, 1936, describes a means to secure a cow's leg during milking.

French Patent No. 2,327,726 to Marek, that issued June 17, 1977, describes a chain link shackle for dogs that is connected to a dog's front legs and collar.

A device disclosed in U.S. Pat. No. 4,934,321 to Madsen, that issued June 19, 1990, describes a portion of a chain inserted into a section of stiffly resilient tubing, a purpose of which is to provide a biasing force to improve the security of the engagement mechanism.

While the structural arrangements of these prior art devices at first appearance have similarities with the device of the present invention, they differ in material respects. These differences which will be described in more detail hereinafter are essential for the effective use of the invention and which admit of the advantages that are not available with the prior devices.

OBJECTS AND SUMMARY OF THE INVENTION

It is an important object of the invention to provide a hobble that does not cause irritation to the leg of the animal when it is worn for extended periods of time.

It is also an object of the invention to provide a hobble that is easy to attach and to detach from the legs of an animal.

Another object of the invention is to provide a hobble that is secure in the manner of its attachment and therefore is resistant to accidental removal.

Still another object of the invention is to provide a means by which the shock forces induced upon the legs of a hobbled animal are reduced.

Yet another object of the invention is to provide a hobble that is not abrasive to the legs of the animal.

It is a further important object of the invention to provide a means to hitch an animal to a picket that embodies the heretofore mentioned objects and benefits of the present improved hobble.

Yet a further object of the invention is to provide a hobble that limits absolutely the maximum stride permissible while it is being worn by the animal.

Briefly, a hobble that is constructed in accordance with the principles of the present invention embodies at least one cuff formed to fit snugly about the leg of an animal to be hobbled. The cuff has an outer sleeve formed of a soft material to fit the leg comfortably. A length of surgical tubing within the soft sleeve has its ends attached to swivels. The cuff is held in place about the leg of an animal by attaching both swivels to a suitable attachment that permits easy and ready removal by a person but is not removable accidentally, such as a snap ring hook, for example. The leg cuff has an inner section of rope within the surgical tubing fastened at each end to the swivel. A a length of surgical tubing, or the like, connects the snap ring hook to a preselected object for limiting the mobility of the animal. When two leg cuffs are used, the object will be the second leg cuff. Such a second cuff will be substantially like the first cuff.

The above and other objects, advantages and features of the present invention will become more readily apparent from the following detailed description of the presently preferred embodiment as illustrated in the accompanying drawing.

DETAILED DESCRIPTION OF THE INVENTION

Figure 1:
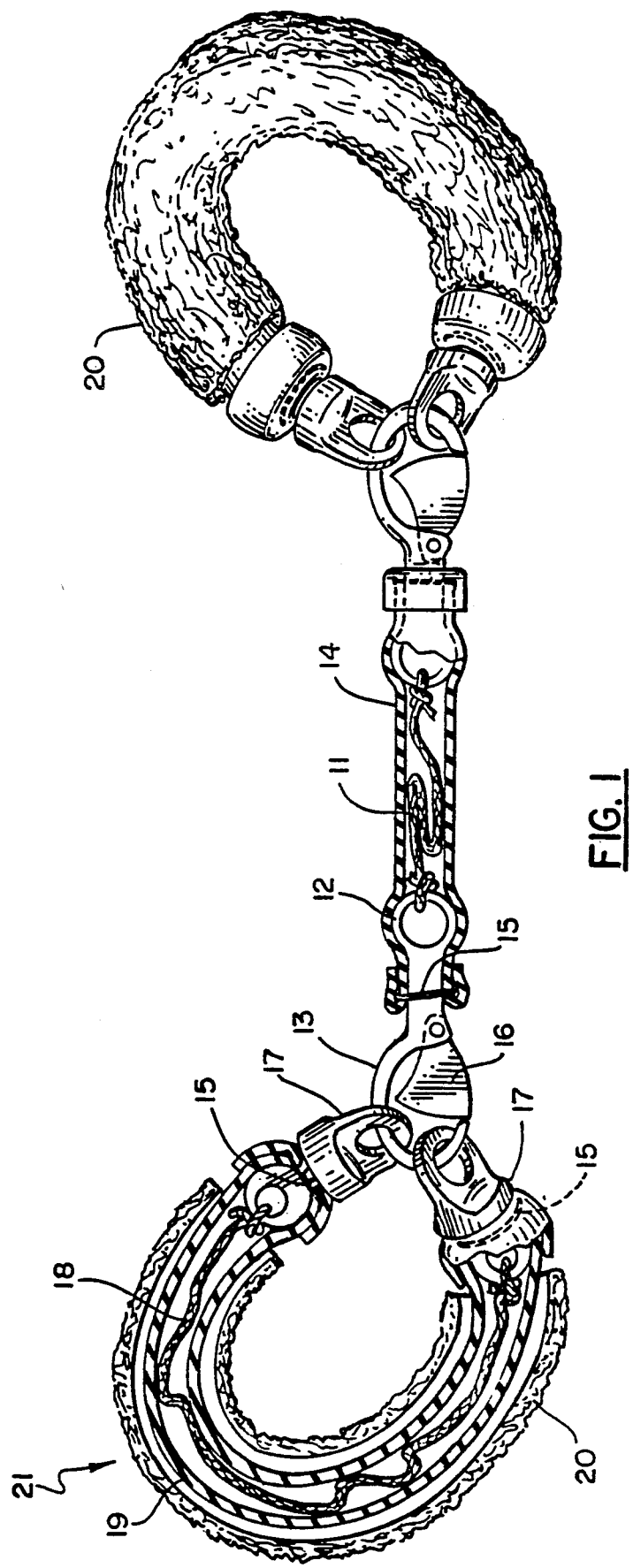
FIG. 1 is a view partly in cross section illustrating a preferred form of a hobble that is constructed and arranged in accordance with the present invention.

Referring to FIG. 1, an improved hobble is identified generally by the numeral 10. Each end of a safety rope 11 is fastened to the eye ring 12 of a bull snap ring 13.

The length of the safety rope 11 is preselected to limit the maximum stride that is to be permitted for an animal. Therefore, the length of the safety rope 11, as well as other components of the hobble 10, are varied in size to accommodate situational requirements.

The safety rope 11 is substantially inelastic. While a small degree of initial elasticity by the safety rope 11 is permissible, it is selected specifically so as to preclude excessive stretching, which is undesirable because it would remove an upper limit to the maximum length of stride that may be taken by a hobbled animal.

A length of a resilient connection, such as surgical tubing 14, covers the safety rope 11 as well as the larger eye ring 12 of each snap ring 13 and extends over the smaller shank of each snap ring 13 sufficiently far so as to cover the eye ring 12 completely. The surgical tubing 14 is secured around the shank of each snap ring 13 by a wire band 15 that is twisted until tight. Any excess wire band 15 material is removed.

The length of surgical tubing 14 that extends past the wire band 15 over the shank of each snap ring 13 is folded back over the wire band 15, thereby covering the wire band 15. This is to prevent contact between the wire band 15 and the leg of the animal.

The open end of the snap ring 13 is formed with a closure 16 that is held in the closed position by an internal spring (not visible). The internal spring supplies the force necessary to retain the closure 16 in the normally closed position.

Access to the snap ring 13 is achieved by grasping and pulling the closure 16 in a direction away from the body of the snap ring 13. When the closure 16 is released, it is urged by the internal spring into the normally closed position.

The principal advantage afforded by the closure 16 of the snap ring 13 is that it cannot be opened by the mere application of a compression force on the closure 16. This is a preferred means for attaching the hobble 10 to an animal. It is a fool proof way of securing the hobble and preventing accidental release.

The length of the center surgical tubing 14 is arranged specifically to be somewhat shorter than the length of the section of center rope 11. This is to ensure that, as a hobbled animal walks, its stride is limited primarily by the elastic properties of the shorter surgical tubing 14.

Because the surgical tubing 14 is elastic, it stretches whenever the animal attempts a gait that exceeds the length of the surgical tubing 14. The act of stretching the tubing 14 reduces impact forces that otherwise would be transmitted directly to the legs of the hobbled animal.

The ability of an elastomer to stretch is proportional to the force applied. Therefore, as a hobbled animal exerts a greater force while walking, or if attempting to run, the center surgical tubing 14 is stretched proportionately. The proportionate stretching and contracting of the surgical tubing 14 ameliorates the detrimental effects which would otherwise arise from the transmittal of shock forces to the legs of the hobbled animal.

The maximum amount of stretching permitted by the surgical tubing 14, regardless of the force being exerted by an animal, is limited by the length of the center rope 11. When the surgical tubing 14 is stretched as far as the hobble 10 allows, the center rope 11 eventually becomes taut between the two snap rings 13. The center rope 11, when taut, prevents additional stretching of the surgical tubing 14, thereby setting a maximum limit to the length of stride that is permitted.

In the event the surgical tubing 14 is severed, the center rope 11 also functions as a safety means. Under this condition, the animal would not benefit from any reduction in impact forces by the surgical tubing 14, but the hobbled animal would nevertheless be unable to wander excessively.

While surgical tubing is described as one element of the preferred form of the invention, it is understood that any elastomeric material may be used as a replacement for the surgical tubing, without departing from either the scope or the benefits provided by the invention.

In use, each snap ring 13 contains one end of D-ring swivels 17. A section of leg rope 18 is fastened to the other end of each of the swivels 17. The leg rope 18 and approximately one-half of each swivel 17 are covered by a length of surgical tubing 19.

The surgical tubing 19 is secured to each swivel 17 by a wire band 15 that is twisted until tight, with any excess wire material removed. The surgical tubing 19 protruding beyond the wire band 15 is folded back over the wire band 15, thereby covering the wire band 15 and preventing the leg of the animal from making contact directly with the wire band 15.

The rope 18 is optional. However when the rope 18 is omitted, the surgical tubing 19 is the only means connecting each swivel 17.

The entire length of surgical tubing 19 is surrounded by a fleece cover 20 that further protects the leg of an animal from abrasion caused by protracted contact with the hobble 10. The fleece cover 20 allows the hobble 10 to be worn by an animal for extended periods of time without damage to its legs.

While fleece is preferred, the surgical tubing 19 may be covered by any fabric that forms a suitable non-abrasive cover for contact directly against the legs of an animal.

Each assembly that includes the surgical tubing 19, two wire bands 15, two swivels 17, and non-abrasive cover 20 is referred to as a leg cuff 21.

In normal use, one leg cuff 21 is wrapped around one of the legs of an animal to be hobbled, and the exposed ends of each swivel 17 are attached to one of the snap rings 13. A second leg cuff 21 is attached around another leg of the animal to be hobbled and is attached to the other snap ring 13.

When it is necessary to limit mobility further, more than two leg cuff 21 may be used to attach three or even four of an animal's legs close together. When more than two leg cuffs 21 are used, an additional center connection 11, 12, 13, 14 is required also.

One snap ring 13 of each additional center connection 11, 12, 13, 14 is connected to both of the swivels 17 of each additional leg cuff 21 after the leg cuff has been wrapped around the third or fourth leg of the animal. The remaining snap ring 13 of each additional center connection then is attached to one of the snap rings 13 of the original center connection. This, in effect, hobbles three or more legs of the animal and greatly impedes the mobility of the animal.

Often it is necessary to hitch an animal, such as a horse or a mule, to a picket (not illustrated) in order to limit the animal's mobility to a predetermined area. To accomplish this, the hobble 10 is fastened to only one leg of the animal by using only one leg cuff 21.

One leg cuff 21 is wrapped around one leg of the animal and both swivels 17 are connected to one of the snap rings 13 of the center connection. A second leg cuff 21 is removed from the remaining snap ring 13 of the hobble 10 and is not used in this instance.

One end of a longer resilient or elastic connection (not illustrated) is fastened to the exposed snap ring 13, and the other end of the connection is connected to a picket. The animal now is effectively hitched to the picket, while simultaneously being able to benefit from the shock absorbing characteristics of the center connection, as well as the non-abrasive characteristics of the leg cuff 21.

The invention has been shown, described, and illustrated in substantial detail with reference to the presently preferred embodiment thereof. It will be understood by those skilled in this art that other and further changes and modifications may be made without departing from the spirit and scope of the invention which is set forth in the claims appended hereto.

What is claimed is:

1. An animal hobble for limiting the mobility of an animal, including:
   cuff means formed to fit snugly about a leg of an animal to be hobbled;
   the improvement comprising:
   outer sleeve means formed of a relatively soft material for fitting non-abrasively against the leg of said animal;
   surgical tube means of a predetermined length within said sleeve means having opposite ends terminating in swivel means;
   means for attaching said swivel means about the leg of said animal; and
   resilient means of a predetermined length and having two ends, one of said ends being attached to said attaching means and the other of said two ends being attached to a predetermined object at a predetermined distance from said cuff means;
   whereby the mobility of said animal is limited in a predetermined manner.

2. An animal hobble as described by claim 1 wherein said improvement further includes second cuff means formed to fit snugly about another leg of said animal, and said other of said two ends being attached to said second cuff means.

3. An animal hobble as described by claim 1 wherein said improvement further includes flexible, non-resilient means within said resilient means having a length longer than said predetermined distance and said flexible, non-resilient means being attached at said two ends.

4. An animal hobble as described by claim 1 wherein said improvement further includes said surgical tube means having means fitted tightly over said surgical tube means attaching said opposite ends to swivel means, and each of said opposite ends folded back over said tightly fitted means.

5. An animal hobble as described by claim 1 including non-extensible means within said surgical tube means with ends attached to said swivel means as a safety means for said cuff means.

6. An animal hobble for limiting the mobility of an animal, comprising:
   first cuff means formed to fit snugly about the leg of an animal to be hobbled;
   said first cuff means having an outer-sleeve means formed of a soft, non-abrasive material for fitting against the leg of said animal, extensible tubular means within said outer sleeve means for permitting limited flexibility to said first cuff means, said extensible tubular means having opposite ends terminating in swivel means;
   second cuff means formed similar to said first cuff means to fit snugly about a second leg of said animal;
   band means affixing said extensible tubular means at said opposite ends to said swivel means;
   each of said opposite ends being folded back over said band means;
   hook means for attaching said swivel means of said first and second cuff means about the legs of an animal for said, and
   resilient means of a predetermined length with two ends, one of said two ends being attached to the hook means of said first cuff means and the other of said two ends being attached to the hook means of said second cuff means;
   whereby the mobility of said animal is limited in a predetermined manner.

7. An animal hobble as defined by claim 6 including auxiliary connection means of a flexible, non-extensible material longer than said predetermined length of said resilient means, to function as a safety means.

8. An animal hobble as defined by claim 6 wherein said resilient means of a predetermined length is surgical tubing.

9. An animal hobble as defined by claim 8 wherein the end of said surgical tubing is attached to said hook means by a band.

10. An animal hobble as defined by claim 9 wherein said surgical tubing is folded back over said band at opposite ends thereof.

* * * * *